(12) United States Patent
Hennemann

(10) Patent No.: US 9,174,403 B2
(45) Date of Patent: Nov. 3, 2015

(54) METHOD OF MANUFACTURE OF PIPE WITH REINFORCED FEMALE END

(71) Applicant: Bilfinger Water Technologies, Inc., New Brighton, MN (US)

(72) Inventor: Thomas L. Hennemann, Cottage Grove, MN (US)

(73) Assignee: Bilfinger Water Technologies, Inc., New Brighton, MN (US)

( * ) Notice: Subject to any disclaimer, the term of this patent is extended or adjusted under 35 U.S.C. 154(b) by 218 days.

(21) Appl. No.: 13/710,101

(22) Filed: Dec. 10, 2012

(65) Prior Publication Data

US 2014/0157568 A1 Jun. 12, 2014

Related U.S. Application Data

(62) Division of application No. 12/650,755, filed on Dec. 31, 2009.

(51) Int. Cl.
*B29D 23/00* (2006.01)
*B29C 57/04* (2006.01)

(52) U.S. Cl.
CPC ............. *B29D 23/003* (2013.01); *B29C 57/04* (2013.01); *Y10T 29/49826* (2015.01); *Y10T 29/49863* (2015.01); *Y10T 29/49865* (2015.01); *Y10T 29/49908* (2015.01); *Y10T 29/49911* (2015.01)

(58) Field of Classification Search
CPC B29D 23/003; B29C 57/04; Y10T 29/49911; Y10T 29/49908; Y10T 29/49863; Y10T 29/49865; Y10T 29/49826
USPC ........... 29/446, 447, 428, 505, 506, 507, 523; 285/333, 334, 355, 390, 329, 115, 423, 285/148, 19, 357, 258
See application file for complete search history.

(56) References Cited

U.S. PATENT DOCUMENTS

| 1,671,458 A | 5/1928 | Wilson |
| 2,107,716 A | 2/1938 | Singleton |
| 2,258,066 A | 10/1941 | Oyen |
| 2,289,271 A | 7/1942 | Kane et al. |
| 2,366,067 A | 12/1944 | Elijah |
| 2,574,081 A | 11/1951 | Abegg |

(Continued)

FOREIGN PATENT DOCUMENTS

| GB | 2100818 | 1/1983 |
| WO | WO2007/138159 | 12/2007 |

OTHER PUBLICATIONS

Canadian Patent Office, Office Action dated Nov. 18, 2013 for Canadian Application No. 2,722,644, pp. 1-4.

(Continued)

*Primary Examiner* — John C Hong
(74) *Attorney, Agent, or Firm* — Moore & Van Allen PLLC

(57) ABSTRACT

The present invention is directed to manufacturing processes for manufacturing a single piece of thermostatic pipe from a length of pipe with a female end that is reinforced by a band of reinforcing material extending around the female end. When the pipe and a similar adjacent pipe are threaded together, the band of reinforcing material helps protect the female end against failure due to hoop stresses and/or lateral stresses. In this regard, the reinforcing material is any material with a higher resistance to hoop stresses and/or lateral stresses than the material from which the pipe is made.

21 Claims, 9 Drawing Sheets

(56) References Cited

U.S. PATENT DOCUMENTS

| | | | |
|---|---|---|---|
| 2,741,498 A | 4/1956 | Elliott | |
| 3,336,054 A | 8/1967 | Blount et al. | |
| 3,360,826 A | 1/1968 | Lorang | |
| 3,495,301 A | 2/1970 | Stephens et al. | |
| 3,508,771 A | 4/1970 | Duret | |
| 3,802,908 A | 4/1974 | Emmons | |
| 3,854,759 A | 12/1974 | Cornelius | |
| 3,856,906 A | 12/1974 | Edgar | |
| 3,910,744 A | 10/1975 | Ronden et al. | |
| 3,923,433 A | 12/1975 | Hermes et al. | |
| 4,018,462 A | 4/1977 | Saka | |
| 4,059,293 A | 11/1977 | Sipler | |
| 4,059,379 A | 11/1977 | Korff et al. | |
| 4,083,918 A | 4/1978 | Ronden et al. | |
| 4,134,949 A | 1/1979 | McGregor | |
| 4,154,466 A | 5/1979 | Simmons et al. | |
| 4,266,813 A | 5/1981 | Oliver | |
| 4,276,010 A | 6/1981 | Shartzer | |
| 4,373,754 A | 2/1983 | Bollfrass et al. | |
| 4,426,105 A | 1/1984 | Plaquin et al. | |
| 4,445,265 A * | 5/1984 | Olson et al. | 29/447 |
| 4,501,443 A | 2/1985 | Haring | |
| 4,570,982 A | 2/1986 | Blose et al. | |
| 4,591,195 A | 5/1986 | Chelette et al. | |
| 4,796,928 A | 1/1989 | Carlin et al. | |
| 4,889,620 A | 12/1989 | Schmit et al. | |
| 4,893,658 A | 1/1990 | Kimura et al. | |
| 5,015,014 A | 5/1991 | Sweeney | |
| 5,018,555 A | 5/1991 | Hawerkamp | |
| 5,078,430 A | 1/1992 | St. Onge | |
| 5,106,130 A | 4/1992 | Ellsworth et al. | |
| 5,152,557 A | 10/1992 | Dierickx | |
| 5,251,942 A | 10/1993 | Whaley | |
| 5,277,456 A | 1/1994 | Mer | |
| 5,360,239 A | 11/1994 | Klementich | |
| 5,360,240 A | 11/1994 | Mott | |
| 5,398,975 A | 3/1995 | Simmons | |
| 5,398,981 A | 3/1995 | Barton | |
| 5,406,983 A | 4/1995 | Chambers | |
| 5,437,481 A | 8/1995 | Spears | |
| 5,582,439 A | 12/1996 | Spears | |
| 5,622,670 A | 4/1997 | Rowley | |
| 5,738,388 A | 4/1998 | Sundelin | |
| 5,826,921 A | 10/1998 | Woolley | |
| 5,827,467 A | 10/1998 | Ruppert | |
| 5,967,568 A * | 10/1999 | Bird | 285/258 |
| 6,209,926 B1 | 4/2001 | Mastro | |
| 6,660,199 B2 | 12/2003 | Siferd et al. | |
| 6,666,480 B2 | 12/2003 | Haney et al. | |
| 6,928,669 B2 | 8/2005 | Akin | |
| 7,017,951 B2 | 3/2006 | Spears | |
| 7,261,326 B2 | 8/2007 | Haney et al. | |
| 7,425,024 B2 | 9/2008 | Haney et al. | |
| 7,470,383 B2 | 12/2008 | Haney et al. | |
| 2011/0156384 A1 * | 6/2011 | Hennemann | 285/55 |

OTHER PUBLICATIONS

Canadian Patent Office, Office Action dated Jan. 15, 2013 for Canadian Application No. 2,722,644, pp. 1-2.
Mid-Continent, "PVC Water Well Casings and Screens" brochure, pp. MP00014-MP00017, published Apr. 1975, place of publication—unknown.
VMT Fibreglass Industries, "Glasspoll Fibreglass Reinforced Plastic Pipes and Screens" brochure, pp. 1-4, Jan. 1998, place of publication—unknown.
Eastern District of Pennsylvania, Order construing term "predetermined interior diameter" of U.S. Pat. No. 6,666,480, (Doc. No. 116), p. 1, Oct. 24, 2005, Civil Action No. 03-CV-2131, published on PACER (www.pacer.gov).
Eastern District of Pennsylvania, "Memorandum of Plaintiff Certainteed Corporation in Support of Motion for Summary Judgment of Invalidity of the Patent in Suit," (Doc. No. 92), pp. 4-7, 9-12, Sep. 19, 2005, Civil Action No. 03-CV-2131, published on PACER (www.pacer.gov).
Marcel Decker, Inc., Thomas Sixsmith, "Handbook of Thermoplastic Piping System Design," pp. 137-141, 1997, ISBN No. 0-8247-9846-5.
CertainTeed Corporation, "Kwik-Set® Threaded Drop Pipe" brochure, p. 1, 2004, place of publication—unknown.
Eastern District of Pennsylvania, "Memorandum and Order" construing certain claim terms of U.S. Pat. No. 6,666,480, (Doc. No. 75), pp. 1-19, May 2, 2005, Civil Action No. 03-CV-2131, published on PACER (www.pacer.gov).
Transcript of Nov. 18, 2004 deposition of Northern Products witness Victor Weigel, pp. 40-41, 85-91, Civil Action No. A3-04-18 in the North Dakota District Court, Southeastern Division.

* cited by examiner

METHOD OF MANUFACTURE OF PIPE WITH REINFORCED FEMALE END

The present invention relates generally to the method of manufacture of a threaded, submersible pump drop pipe and casing assembly connection for use in water well and related systems.

Piping systems with threaded connections are well known in the art. Threaded connections connect lengths of pipe using internal threads on the female end of a pipe that interlock with external threads on the male end of a similar adjacent pipe.

During manufacturing of the pipe, external threads are machined into the male end of the pipe and internal threads are machined into the female end of the pipe, typically through automated cutting processes. The shape of the threads, or "thread profile," can vary greatly and often depends on the particular application of the pipe. For example, triangular threads, square threads, rounded threads, and even trapezoidal threads are well known in the art.

Another thread characteristic that depends on the application of the pipe is whether the threads are machined on a pitch as the threads extend away from the leading edge of the pipe. Threads cut on a pitch, called "tapered threads," create a pipe with a gradually changing circumference as the threads extend away from the leading edge of the pipe. As such, for example, the outer circumference of a male end of a pipe with tapered threads increases as the threads extend away from the male leading edge of the pipe, causing the male end of the pipe to be generally shaped as a truncated cone.

Pipes with tapered threads are well known in the art and offer certain advantages over pipes with non-tapered threads (i.e., threads not cut on a pitch). For example, specific types of tapered threads such as NPTF threads (also known as Dryseal threads) are used in many piping applications to create watertight (or fluid tight) connections without requiring a sealing compound. The watertight connection is formed through a mechanical seal when the internal threads of the female end of a pipe deform into the external threads of the male end of an adjacent pipe (and vice versa) during tightening of the threaded connection.

Tapered threads also have a disadvantage in that care must be taken not to apply too much torque so as to overtighten the connection. Threaded connections with tapered threads are considered "hand-tight" (also known as "finger-tight") at the point when the male end of the pipe can no longer thread into the female end of an adjacent pipe by hand because the taper on the threads has caused the male end to become jammed within the female end. From hand-tight, a wrench is used to turn at least one of the connected pipes, making the connection "wrench-tight." Wrench-tight is generally accepted as being a maximum of two turns past hand-tight.

If one is not careful the threaded connection can be overtightened past wrench-tight and threaten the integrity of the connection. Overtightening the connection causes hoop stress on the female end of the pipe which, when large enough, will split the female end and cause a failed connection. Hoop stress is a problem with tapered threads that is well known in the art and often occurs near the last internal threads—i.e., the internal threads furthest away from the female leading edge of the pipe—although the failure can occur elsewhere on the female end.

Another problem for threaded connections is lateral stress failure of the connection due to lateral forces on the pipe and/or the connection. Although pipes with tapered threads are susceptible to lateral stress failure, this type of failure most frequently occurs on pipes with non-tapered internal threads (i.e., threads that are not cut on a pitch) within the female end of the pipe. Lateral stress failure usually occurs because the manufacturing process for forming the internal threads weakens the pipe wall. Non-tapered internal threads, as well as tapered internal treads, are typically formed in the interior wall of the pipe at the female end by cutting out a portion of the pipe wall. Removing material from the pipe wall decreases the wall thickness and makes the female end of the pipe more prone to lateral stress failure.

Lateral stress failure often occurs near the first internal threads—i.e., where the internal threads begin, near the female leading edge of the pipe—but can also occur elsewhere on the female end. In addition, the amount of threads cut into the female end of a pipe can increase its susceptibility to failure from lateral forces and pipes with more threads have a greater tendency to fail. As a result, a need also exists for strengthening pipes that use threaded connections to increase their resistance against lateral stress failure.

The present invention is directed to a pipe with a reinforced female end to protect against failure of a threaded connection due to hoop stress and/or lateral stress.

The pipe of the present invention has a female end for receiving a male end of a similar adjacent pipe. At least a portion of the pipe at the female end has a reinforcement band that extends circumferentially around the pipe. The reinforcement band is preferably in the form of a cylinder that extends completely around the circumference of the pipe, although other embodiments with the reinforcement band extending only partially around the circumference of the pipe are contemplated by the present invention. Regardless, the reinforcement band is made from a rigid material or materials that are stronger than the material or materials from which the pipe is made. More specifically, the reinforcement band should have material characteristics which withstand higher hoop stresses and/or lateral stresses than the pipe material.

The present invention is also directed to a manufacturing processes to form the pipe of the present invention. The claimed manufacturing process is for extruded thermoplastic pipe, such as polyvinyl chloride (PVC) pipe or polyethylene pipe, which is belled with a mandrel after extrusion. Prior to belling, the reinforcement band is positioned around the female end of the pipe and when the pipe is enlarged through the belling process, the reinforcement band is embedded into the outer wall of the pipe or at least press fit against the outer wall of the pipe. In addition, a manufacturing process for implementing the reinforcing band into a thermosetting pipe, such as fiber reinforced plastic (FRP) pipe, is also disclosed.

Figure 1:
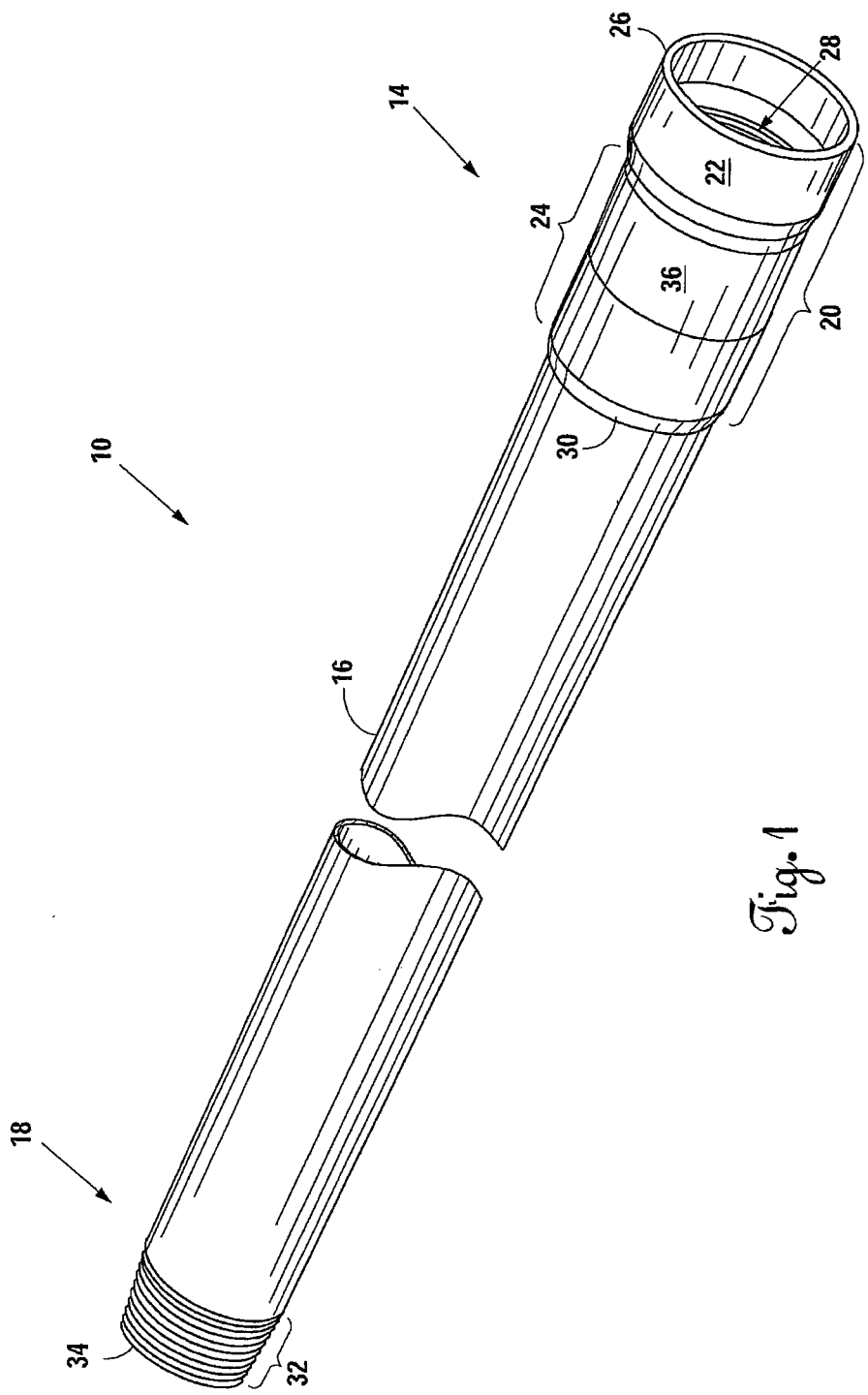
FIG. 1 is a perspective view of the preferred embodiment of the present invention.
Figure 2:
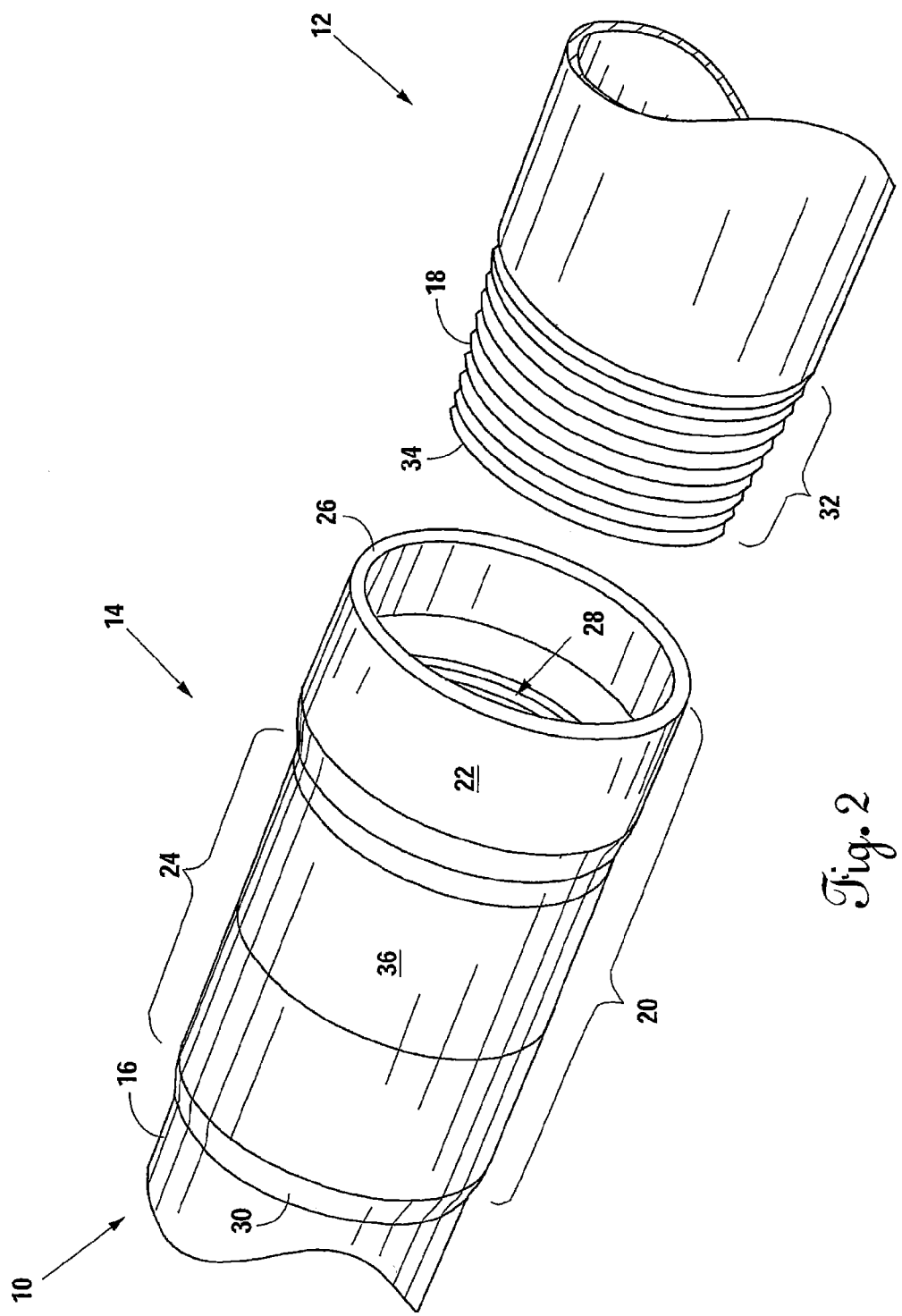
FIG. 2 is an exploded perspective view of the preferred embodiment of the present invention, as shown with the female end of one pipe and the male end of a similar adjacent pipe.
Figure 3:
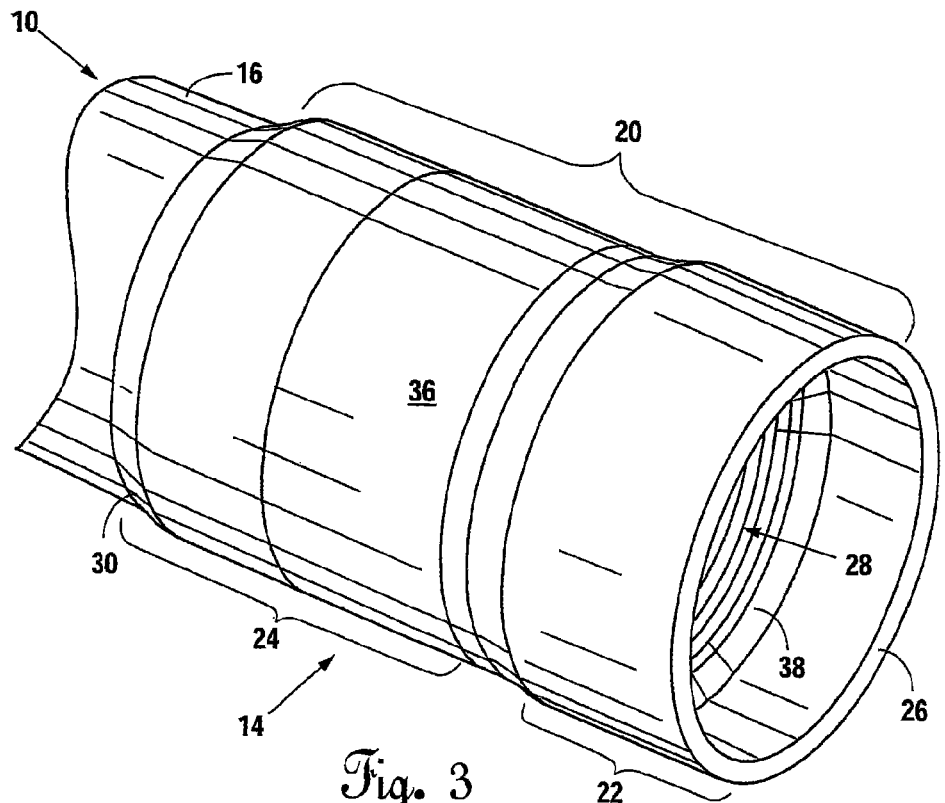
FIG. 3 is a perspective view of the female end of the preferred embodiment of the pipe of the present invention.
Figure 3A:
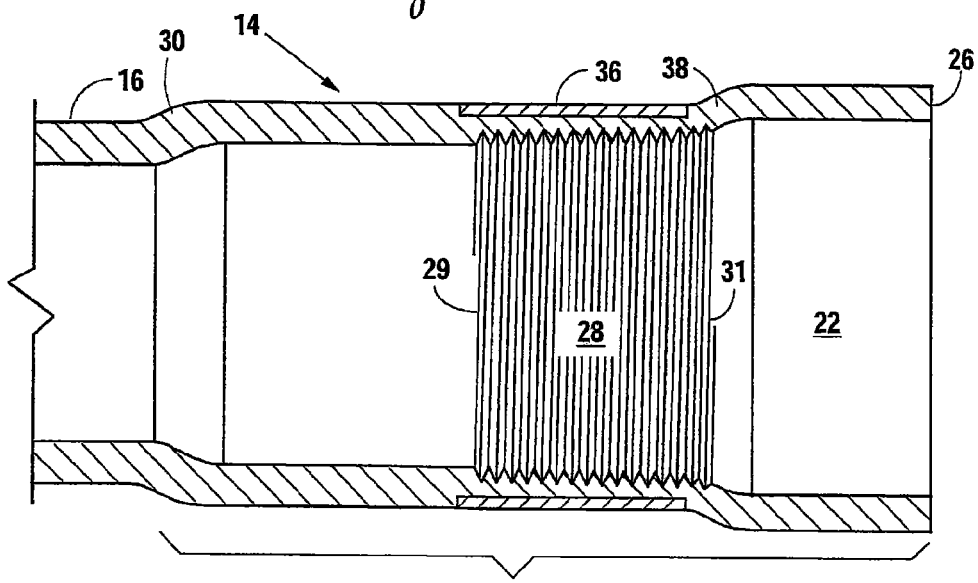

FIG. 3A a cross sectional side view taken along the female end of the preferred embodiment of the pipe of the present invention shown in FIG. 3.

Figure 3B:
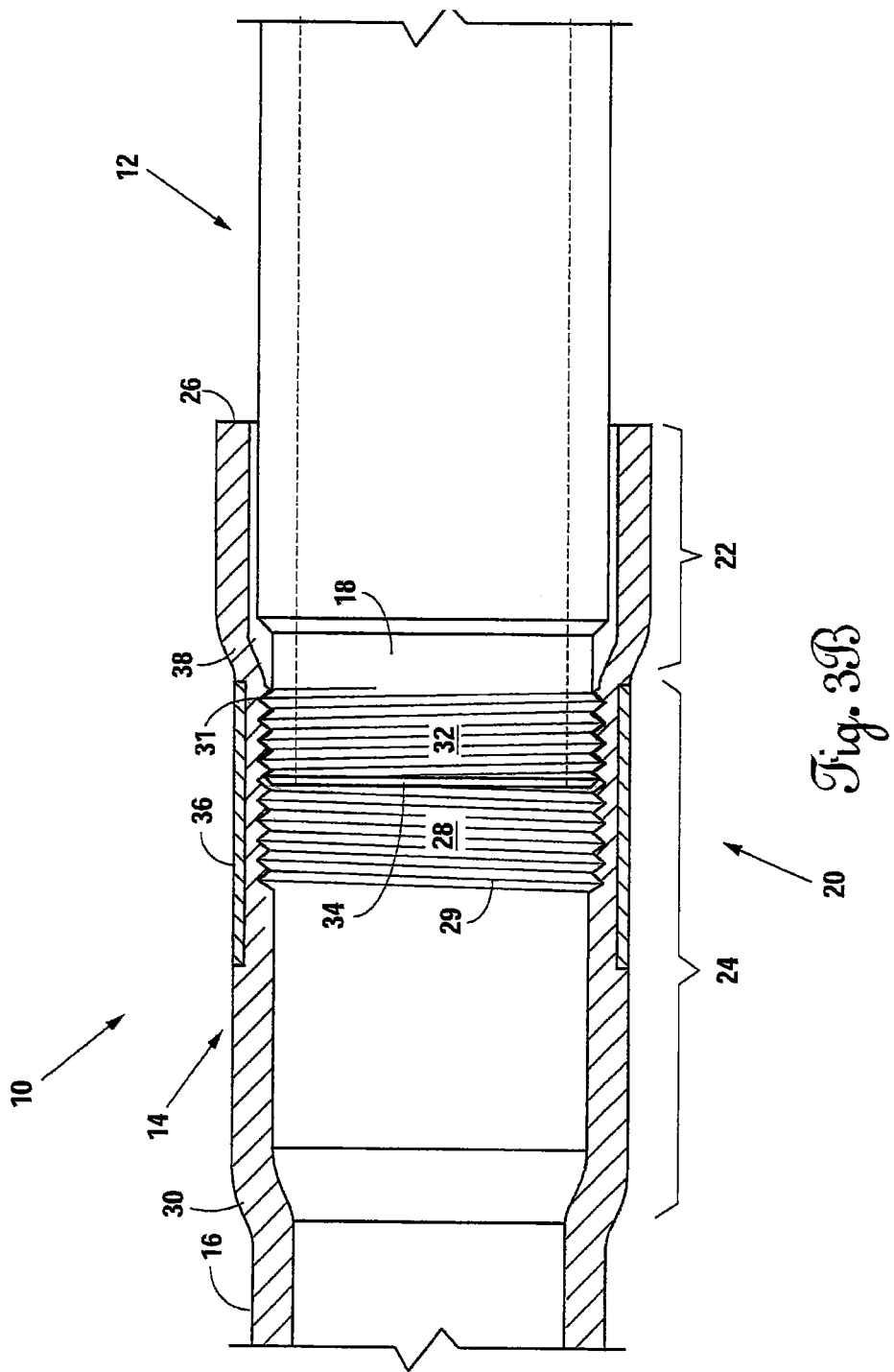

FIG. 3B is a cross sectional side view taken along the female end of an alternative embodiment of the present invention showing a pipe connected to a similar adjacent pipe mated to hand tight.

Figure 3C:
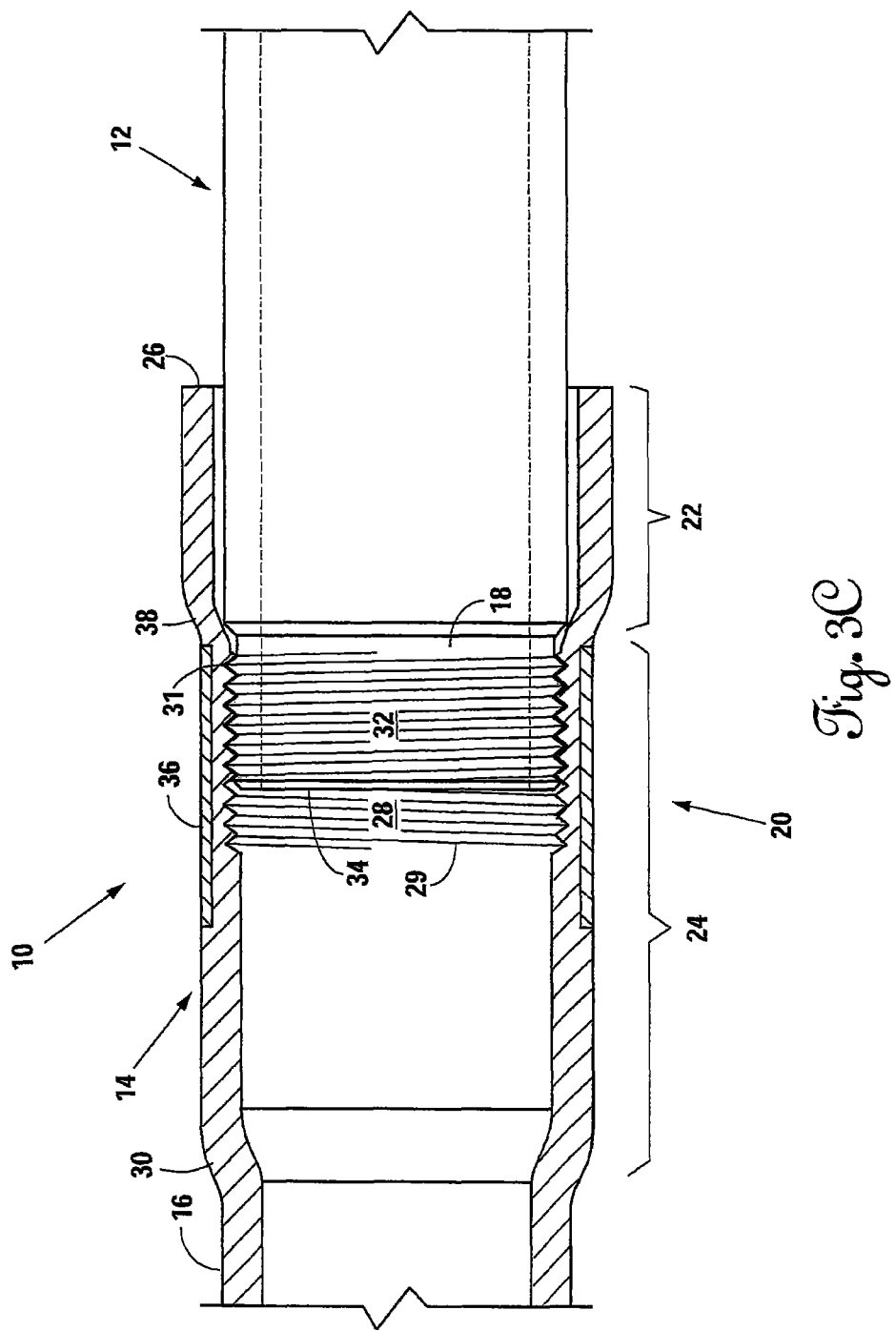

FIG. 3C is a cross sectional side view taken along the female end of an alternative embodiment of the present invention showing a pipe connected to a similar adjacent pipe mated to wrench tight.

Figure 4:
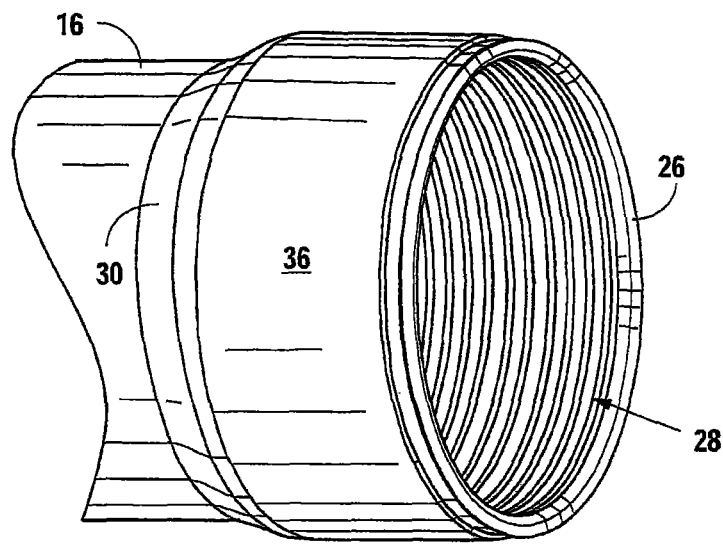

FIG. 4 is a perspective view of the female end of an alternative embodiment of the pipe of the present invention.

Figure 4A:
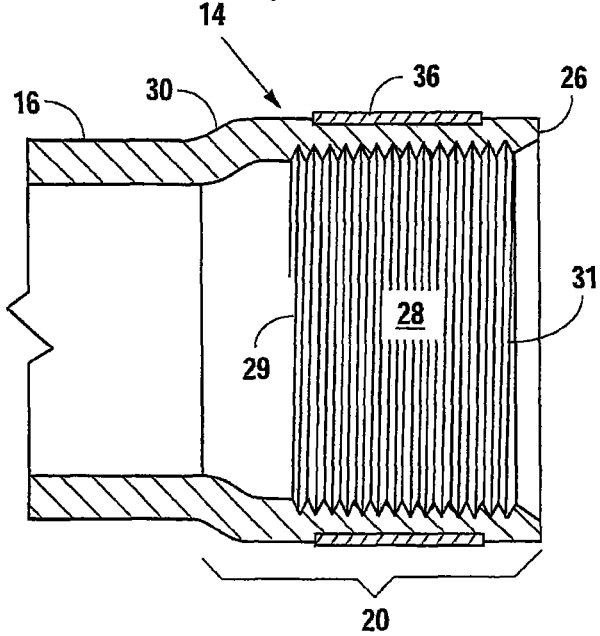

FIG. 4A is a cross sectional view taken along the female end of the alternative embodiment of the present invention shown in FIG. 4.

Figure 5:
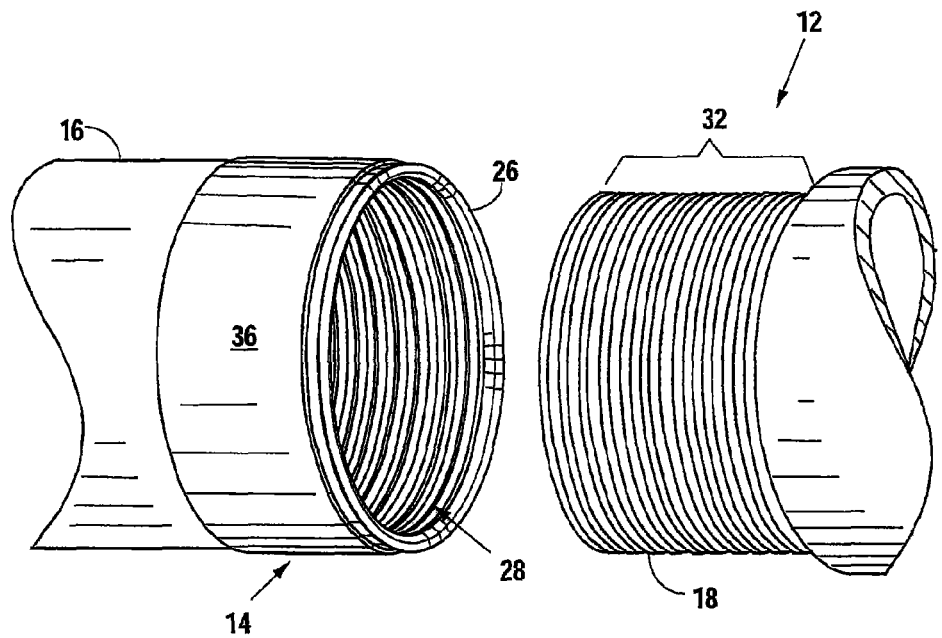

FIG. 5 is a perspective view of the female end of another alternative embodiment of the present invention.

Figure 5A:
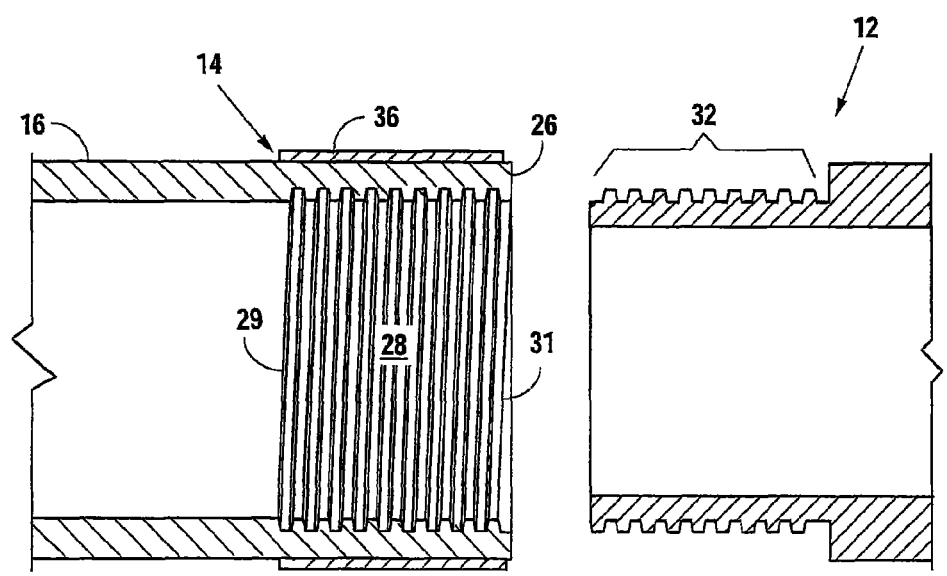

FIG. 5A is a cross sectional view taken along the female end of the alternative embodiment of the present invention shown in FIG. 5.

Figure 6:
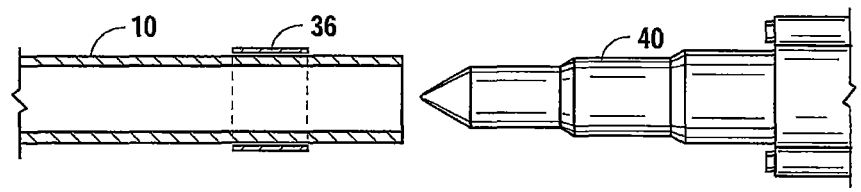

FIG. 6 is a cross sectional view of the pipe and a perspective view of a mandrel prior to insertion of the mandrel into the pipe, during the preferred manufacturing process for the preferred embodiment of the present invention.

Figure 6A:
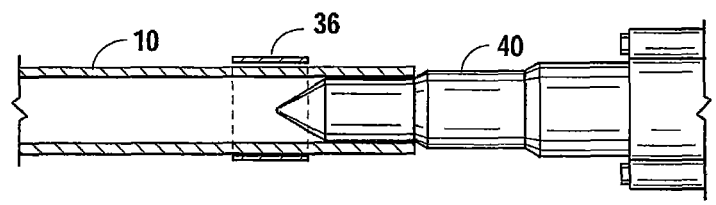

FIG. 6A is a cross sectional view of the pipe and a perspective view of a mandrel after the mandrel has been initially inserted in the pipe, during the preferred manufacturing process for the preferred embodiment of the present invention.

Figure 6B:
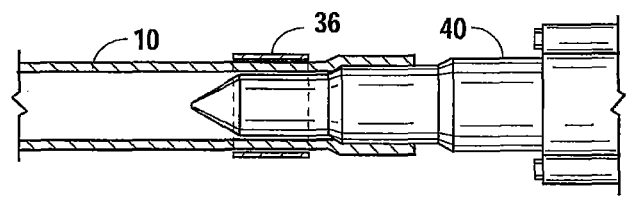

FIG. 6B is a cross sectional view of the pipe and a perspective view of a mandrel after the mandrel has been further inserted into the pipe, during the preferred manufacturing process for the preferred embodiment of the present invention.

Figure 6C:
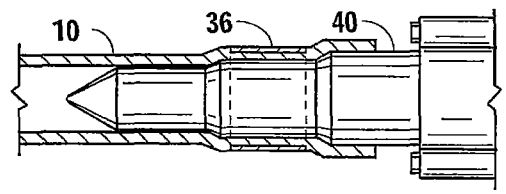

FIG. 6C is a cross sectional view of the pipe and a perspective view of a mandrel after the mandrel has been fully inserted into the pipe, during preferred manufacturing process for the preferred embodiment of the present invention.

Figure 7:
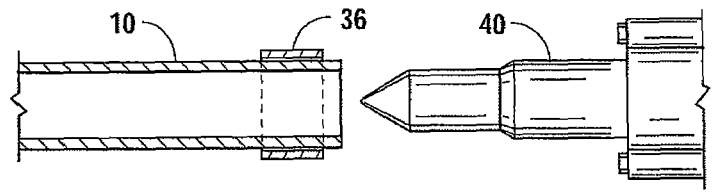

FIG. 7 is a cross sectional view of the pipe and a perspective view of a mandrel prior to insertion of the pipe onto the mandrel, during an alternative manufacturing process for an alternative embodiment of the present invention.

Figure 7A:
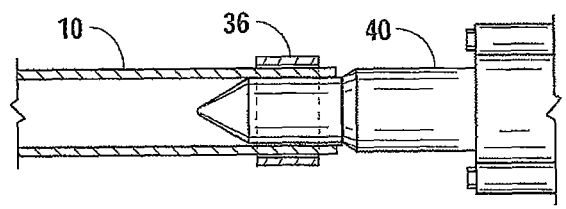

FIG. 7A is a cross sectional view of the pipe and a perspective view of a mandrel after the pipe has been partially inserted over the mandrel, during an alternative manufacturing process for an alternative embodiment of the present invention.

Figure 7B:
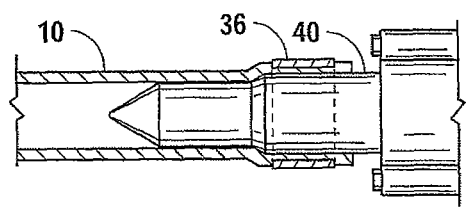

FIG. 7B is a cross sectional view of the pipe and a perspective view of a mandrel after the pipe has been fully inserted onto the mandrel, during an alternative manufacturing process for an alternative embodiment of the pipe present invention.

Referring to FIGS. 1 through 3A, the preferred embodiment of the present invention is shown with a pipe 10 and a similar adjacent pipe 12. In practice, the pipe 10 has the same structure as the similar adjacent pipe 12 and therefore, a description of structure that is present for the similar adjacent pipe 12 applies equally to a description of the structure for the pipe 10, and vice versa.

Pipe 10 has a female end 14, an intermediate length 16, and a male end 18. The female end 14 has an enlarged exterior diameter 20 with preferably a distinct first cylinder section 22 and a distinct second cylinder section 24. First cylinder section 22 terminates the female end 14 of the pipe 10 at a female leading edge 26. In the preferred embodiment, second cylinder section 24 is between the first cylinder section 22 and the intermediate length 16, and, transitions directly into the intermediate length 16. In this regard, there is preferably an external shoulder 30 between the second cylinder section 24 and the intermediate length 16. The male end 18 of the pipe 10 is opposite the female end 14 and is also adjacent the intermediate length 16. The male end 18 has external threads 32 disposed thereon and terminates the pipe 10 at a male leading edge 34.

Internal threads 28 are formed on the interior surface of at least a portion of the female end 14 (see FIGS. 1-5A). In the preferred embodiment shown in FIGS. 1-3A, the internal threads 28 are formed within the second cylinder section 24.

The form and number of internal and external threads 28, 32 depend on the application and size of the pipe 10. For example, the preferred embodiment of the present invention for one inch diameter PVC drop pipe has internal and external threads 28, 32 that are tapered, have a triangular thread profile, and conform to ASTM Standard F-1498 for the amount of threads. Preferably, the external threads 32 start at a beveled male leading edge 34 of the male end 18 and the female end 14 has internal threads 28 within the second cylinder section 24 that begin approximately 0.93 inches from the female leading edge 26 and span over slightly more than one inch of pipe length within the second cylinder section 24. One with skill in the art will recognize, however, that characteristics like the thread profile, the length of pipe 10 over which the threads span, whether the threads are tapered, and how far the threads start from their respective leading edges, will vary according to the application and size of the pipe 10.

Regardless of the thread characteristics and the pipe application, a reinforcement band 36 extends circumferentially around at least a portion of the female end 14 of the pipe 10. The reinforcement band 36 is made from a material that has a greater resistance against hoop stress and/or lateral stress than the material from which the pipe 10 is made. As discussed in more detail infra, the material composition of the reinforcement band 36 and the dimensions of the reinforcement band 36 will largely depend on the manufacturing processes of the pipe 10. Preferably, however, the reinforcement band 36 will be made from metal or some sort of metal alloy such as stainless steel.

In its preferred embodiment, the reinforcement band 36 is a single, complete cylinder that extends around at least a portion of the enlarged exterior diameter 20 of the female end 14. The edges of the reinforcement band 36 are also preferably embedded in the outer wall of the pipe 10 such that the material from which the pipe 10 is made at least partially covers the edges of the reinforcement band 36. Embedding the reinforcement band 36 in this manner prevents the band 36 from becoming axially displaced from its original position around the pipe. However, in alternative embodiments the reinforcement band 36 may not be embedded in the outer wall of the pipe 10. Instead, the outer wall of the enlarged diameter 20 may be formed to firmly press against the reinforcement band 36 with enough friction to hold the band 36 in place.

Preferably, the reinforcement band 36 is positioned in the outer wall of the female end 14 opposite the internal threads 28 and extending along the length of at least a portion of the internal threads 28. To provide the most protection against failure, at least a portion of the reinforcement band 36 should be placed opposite the last internal thread 29, and preferably extend beyond the last internal thread 29 (see FIG. 3A). Likewise, at least a portion of the reinforcement band 36 may be positioned opposite and extend beyond the first internal thread 31 (see FIGS. 3B & 3C). However, this positioning may not be desirable, depending on the embodiment of the pipe 10. For example, in the preferred embodiment of the pipe 10 the reinforcement band 36 is not positioned opposite the first internal thread 31 because a shoulder 38 is present between the first cylinder section 22 and the second cylinder section 24 (see FIG. 3A). In this regard, the preferred embodiment for the one inch PVC drop pipe mentioned above, has a reinforcement band 36 that is 1.53 inches wide and extends along the second cylinder section 24 from beyond the last internal thread 29 up to the shoulder 38, making the reinforcement band 36 positioned opposite substantially all of the internal threads 28 (see FIG. 3A).

In alternative embodiments, however, the reinforcement band 36 may be positioned so that it extends beyond the first internal thread 31 (see FIGS. 3B & 3C), or, the reinforcement band 36 may be positioned opposite only a smaller portion of the internal threads 28 such as in the embodiment shown in FIG. 4A. In fact, the reinforcement band 36 may not be positioned opposite the internal threads 28 at all. For example, the reinforcement band 36 may extend around the first cylinder section 22 of the female end 14. In another embodiment, the reinforcement band 36 may extend only partially around the circumference of the female end 14. Furthermore, there may be more than one reinforcement band 36 present. Typically, the form of the reinforcement band 36 and whether more than one reinforcement band 36 is present will depend on factors like the application of the pipe 10 and strength of the material from which the reinforcement band 36 is made, as well as the thickness and width of the reinforcement band 36.

As mentioned, the preferred embodiment of the present invention has a distinct first cylinder section 22 and a distinct second cylinder section 24 at the female end 14 of the pipe 10 (see FIGS. 1-3A). The first cylinder section 22 and the second cylinder section 24 are separated from one another by the shoulder 38 between the two sections. The interior diameter of the first cylinder section 22 is larger than the interior diameter of the second cylinder section 24 with the interior diameter of the second cylinder section 24 being defined as the diameter at the crest of the last internal thread 29.

As the male end 18 of the similar adjacent pipe 12 is inserted into the first cylinder section 22 of the preferred embodiment of the pipe 10 it is funneled to the second cylinder section 24. Preferably the male leading edge 34 of the similar adjacent pipe 12 is beveled to aid such funneling. Once at the second cylinder section 24, the external threads 32 of the male end 18 encounter the internal threads 28 of the second cylinder section 24 and turning of the similar adjacent pipe 12 relative to the pipe 10 will cause the threads of the pipes to interlock in a manner well known in the art.

The first cylinder section 22 of the preferred drop pipe embodiment is also preferably elongated so that it receives a substantial portion of the engaging external threads 32 from the similar adjacent pipe 12 before the external threads 32 begin to thread into the internal threads 28 of the pipe 10. The engaging external threads 32 are only those threads which interlock with the internal threads 28 when tightened. The elongated first cylinder section 22 provides additional lateral strength to the threaded connection once the connection is formed and promotes increased watertightness of the connection. In this regard, pipes connected by threaded connections typically leak at the threads when lateral force is applied to the connected pipes and the elongated first cylinder section 22 protects against these lateral forces, as detailed in U.S. Pat. Nos. 6,666,480, 7,261,326, 7,470,383, and 7,425,024.

Furthermore, the interior diameter of the first cylinder section 22 in the preferred PVC drop pipe embodiment of the present invention mentioned above is only slightly larger than the exterior diameter of the male end 18 of the pipe 10 at the crest of the external threads 32 and minimal clearance exists between the male end 18 of the similar adjacent pipe 12 and the female end 14 of the pipe 10 when the male end 18 is inserted into the first cylinder section 22 of the pipe 10.

Though FIGS. 3B & 3C do not show the preferred placement of the reinforcement band 36 relative to the internal threads 28 nor do they show the preferred location of internal threads 28, they do show the preferred shape of the female end 14 with the distinct first and second cylinder sections 22, 24 separated by shoulder 38. FIG. 3B shows the female end 14 of the pipe 10 connected to the male end 18 of the similar adjacent pipe 12 with the internal threads 28 of the pipe 10 and the external threads 32 of the similar adjacent pipe 12 mated to hand tight, which according to ASTM Standard F-1498 for one-inch pipe is 4.60 threads. FIG. 3C shows the same embodiment of the pipe 10 connected to the similar adjacent pipe 12 shown in FIG. 3B, but, the internal threads 28 of the pipe 10 and external threads 32 of the similar adjacent pipe 12 are mated to wrench tight, which is generally accepted as being a maximum of two turns past hand tight. In both FIGS. 3B & 3C, the mated pipes preferably form a watertight connection so that water does not leak from the engaged internal and external threads 28, 32.

Other embodiments of the present invention do not have a distinct first cylinder section 22 and a distinct second cylinder section 24. In the alternative embodiment shown in FIGS. 4 & 4a the two different interior diameters are the interior diameter at the bevel and the interior diameter at the crest of the last internal thread 29. This alternative embodiment of the pipe 10 has the reinforcement band 36 positioned opposite from the internal threads 28 of the female end 14 and the reinforcement band 36 extends along the length of only a portion of the internal threads 28. In this regard, the reinforcement band 36 does not extend beyond the last internal thread 29 or the first internal thread 31.

Further alternative embodiments with no distinct first and second cylinder sections 22, 24 and without distinct interior diameters that differ are also contemplated by the present invention. For example, the alternative embodiment shown in FIGS. 4 & 4A could have a non-beveled female leading edge 26 with the internal threads 28 beginning at and extending from the female leading edge 26. In addition, the alternative "flush mount" embodiment of the pipe 10 shown in FIGS. 5 & 5A also do not have distinct first and second cylinder sections 22, 24 and do not have differing interior diameters at the female end 14.

The alternative flush mount embodiment of the present invention in FIGS. 5 & 5A illustrates the pipe 10 and the similar adjacent pipe 12 without an enlarged exterior diameter 20 at the female end 14 and without an external shoulder 30. As such, the female end 14 is flush with the intermediate length 16. Pipes without an enlarged exterior diameter 20 are well known in the art and when connected, the pipe 10 and the similar adjacent pipe 12 form a so-called "flush mount connection." As shown in FIG. 5A, the pipe 10 in this alternative embodiment does not have tapered internal and external threads 28, 32, but rather, the internal and external threads 28, 32 are non-tapered threads with a trapezoidal thread profile. Depending on the application, however, the internal and external threads 28, 32 could be tapered and have a triangular or other-shaped thread profile.

Additionally, the reinforcement band 36 in the flush mount embodiment shown in FIGS. 5 & 5A is also not embedded in the pipe wall of the pipe 10. Instead, the reinforcement band 36 is shrink fit on the outer wall of the female end 14 so that it tightly presses against the outer wall of the female end 14 of the pipe 10, as explained infra.

Turning to the manufacturing processes for the present invention, FIGS. 6-6C illustrate the preferred manufacturing method for the preferred embodiment for the pipe 10 when the pipe 10 is extruded and belled after such extrusion. As shown, a mandrel 40 is inserted into the pipe 10 after the pipe 10 has been extruded and cut into its desired length.

Extruding the pipe and cutting it to the desired length are manufacturing processes that are well known in the art. After extrusion and cutting, the pipe 10 is typically moved to another location in the manufacturing assembly and one end of the pipe 10 is sufficiently heated to render it pliable. Once pliable, the pipe 10 is clamped into place and the mandrel 40 is forced into the heated end of the pipe 10 by a hydraulic cylinder (not shown) to form the contour of the female end 14 of the pipe 10. The mandrel 40 is made of metal and when pressed against the inner circumference of the pliable end of the pipe 10, the mandrel 40 will force the pliable end outward, thereby increasing both the inner and outer circumference of the pipe 10 where the mandrel 40 is inserted. The increase in both inner and outer circumference of the female end 14 creates the enlarged exterior diameter 20 and the external shoulder 30.

The reinforcement band 36 is sized so that when the mandrel 40 is inserted into the pliable end of the pipe 10, the outer wall of the pipe 10 comes into contact with—and preferably deforms around—the edges of the reinforcement band 36. The reinforcement band 36 is positioned over the pliable end of the pipe 10 prior to insertion of the mandrel 38. Unlike the heated end of the pipe 10, the reinforcement band 36 is not pliable and as the outer wall of the pipe 10 contacts the reinforcement band 36 the outer wall deforms around the edges of the reinforcement band 36 thereby embedding the reinforcement band 36.

The degree or amount of embedding of the reinforcement band 36 into the pliable end of the pipe 10 in the preferred embodiment will depend on the following factors: (1) the size of the reinforcement band 36 relative to the pipe 10 prior insertion of the mandrel 40; (2) the thickness of the reinforcement band 36; (3) the thickness of the outer wall of the pipe 10; and (4) the size of the circumference of the mandrel 40 relative to the pipe 10 prior to insertion of the mandrel 40. With regard to the last factor, the size of the circumference of the mandrel 40 will dictate the amount by which the circumference of the pliable end of the pipe 10 is enlarged. With a one inch extruded PVC drop pipe, for example, the reinforcement band 36 is stainless steel, has an outer diameter of 1.522 inches, and is, at a minimum, 0.020 inches thick.

It should be noted that the mandrel 40 shown in FIGS. 6-6C is designed to form the preferred embodiment of the present invention. As a result, the reinforcement band 36 is positioned over the pliable end of the pipe 10 at a distance that is far enough from the female leading edge 26 so the reinforcement band 36 will embed into the outer wall of the pipe 10 at the second cylinder section 24, opposite where the internal threads 28 will be formed-a step that occurs later in the manufacturing process. As mentioned above, the reinforcement band 36 could be positioned over the pliable end of the pipe 10 so that it embeds in other positions on the outer wall of the pipe 10. It should further be noted that the reinforcement band 36 could be positioned over the end of the pipe 10 prior to heating the end of the pipe 10.

FIGS. 7-7B show an alternative manufacturing process of the present invention, which in this case, is directed to manufacturing the alternative embodiment of the invention shown in FIGS. 4-4A. In this alternative manufacturing process, the mandrel 40 stays static and the pliable end of the pipe 10 is urged over the mandrel 40. Again, the reinforcement band 36 is positioned over the pliable end of the pipe 10 and is sized to have the outer wall of the pipe 10 contact it during the enlarging process, but in this instance, the reinforcement band 36 moves at the same rate with the pliable end of the pipe 10 as the pipe 10 is urged onto the mandrel 40.

Once the mandrel 40 is inserted into the one of the pipe 10, or the one end of the pipe 10 is urged onto the mandrel 40, a cooling agent such as water is applied to the now-enlarged end of the pipe 10. The cooling agent cools the pipe 10 and conforms the enlarged end of the pipe 10 to the shape of the mandrel 40. From this point, the mandrel 40 is removed from the pipe 10, or vice versa, and the pipe 10 has acquired the contour of the mandrel 40 and the reinforcement band 36 is positioned thereon.

Once the mandrel 40 is removed from the pipe 10, the internal threads 28 and external threads 32 are formed. In the preferred embodiment, the internal threads 28 are machined into at least a portion of the interior surface of the second cylinder section 24, or alternatively, throughout the entire interior surface of the second cylinder section 24, using processes that are well known in the art. Similar processes form the external threads 32 on the male end 18.

When the female end 14 of the pipe 10 does not have an enlarged exterior diameter 20 like the alternative embodiment shown in FIGS. 5 & 5A, the process to install the reinforcement band 36 on the female end 14 may be altered. On way to manufacture this embodiment of the present is to shrink fit the reinforcement band 36 on the female end 14. Shrink-fitting is a well-known manufacturing process. The reinforcement band 26 is initially sized such that its interior dimensions are almost identical to the dimensions of the outer wall of the pipe 10 at the female end 14. The reinforcement band 36 is also made from a material that has a coefficient of thermal expansion which allows the reinforcement band 36 to expand when heated and contract back to its original shape when cooled. In this regard, the reinforcement band 36 is preferably made from a material that has a high coefficient of thermal expansion, such as aluminum or brass. The reinforcement band 36 is heated and expands, and then, is positioned around the female end 14 of the pipe 10. After it is moved to its desired position, the reinforcement band 36 is cooled and contracts back to its original shape, causing it to press against the outer wall of the pipe 10.

It should be finally noted that the pipe 10 of the present invention is not limited to extruded pipe 10. The apparatus of the present invention can be implemented into thermosetting pipe and pipes made from other composite materials. In this regard, adding a step for installation of the reinforcement band 36 can be implemented into manufacturing processes that are well known for these other types of pipe. For example, and not by way of limitation, positioning the reinforcement band 36 over the mandrel 40 during the filament winding processes for FRP pipe is within the scope of the apparatus contemplated by the present invention.

Although the present invention has been described with reference to specific embodiments, this description is not meant to be construed in a limiting sense. Various modifications of the disclosed embodiments, as well as alternative embodiments of the invention will become apparent to persons skilled in the art upon the reference to the above-description of the invention. It is, therefore, contemplated that the appended claims will cover such modifications that fall within the scope of the invention.

I claim:

1. A method for manufacturing a single piece of thermoplastic pipe comprising:

extruding said pipe into a predetermined interior diameter and exterior diameter, wherein said pipe has an outer wall comprising an interior surface and an exterior surface;

cutting said pipe into a desired length, said length of pipe having a male end with a male leading edge and a female end with a female leading edge;

positioning a reinforcement band circumferentially around the exterior surface of at least a portion of said female end, the reinforcement band comprising one or more edges;

enlarging the interior and exterior diameters of said female end;

cooling said female end of said pipe with a cooling agent;

forming internal threads on the interior surface of said female end, wherein at least a portion of said internal threads are positioned opposite said reinforcement band; and, forming external threads on the exterior surface of said male end.

2. The method of manufacturing a single piece of thermoplastic pipe as recited in claim 1 wherein said interior and exterior diameters are enlarged with a mandrel.

3. The method of manufacturing a single piece of thermoplastic pipe as recited in claim 2 further comprising:

embedding at least a portion of the one or more edges of said reinforcement band into the outer wall of said pipe at said female end.

4. The method of manufacturing a single piece of thermoplastic pipe as recited in claim 2 further comprising:

heating said female end of said pipe to render it pliable prior to enlarging the exterior diameter of said pipe at said female end.

5. The method of manufacturing a single piece of thermoplastic pipe as recited in claim 2 wherein said mandrel is stationary and said female end of pipe is urged onto said mandrel to enlarge the interior and exterior diameters of said pipe at said female end.

6. The method of manufacturing a single piece of thermoplastic pipe as recited in claim 1 wherein said reinforcement band extends beyond a last thread of said internal thread, in a direction opposite said female leading edge.

7. The method of manufacturing a single piece of thermoplastic pipe as recited in claim 1 wherein said reinforcement band extends beyond a first thread of said internal thread, in a direction towards said female leading edge.

8. The method of manufacturing a single piece of thermoplastic pipe as recited in claim 1 wherein said step of enlarging the interior and exterior diameters of said female end further comprises:

enlarging the interior and exterior diameter of a first cylinder section of said female end; and enlarging the interior and exterior diameter of a second cylinder section of said female end wherein the interior and exterior diameters of said second cylinder section are greater than the interior and exterior diameters of said first cylinder section respectively.

9. The method of manufacturing a single piece of thermoplastic pipe as recited in claim 8 wherein the interior and exterior diameters of said first cylinder section are enlarged with a mandrel.

10. The method of manufacturing a single piece of thermoplastic pipe as recited in claim 9 wherein said reinforcement band is positioned around the exterior surface of said first cylinder section.

11. The method of manufacturing a single piece of thermoplastic pipe as recited in claim 9 further comprising:

embedding at least a portion of the one or more edges of said reinforcement band into the outer wall of said pipe at said female end.

12. The method of manufacturing a single piece of thermoplastic pipe as recited in claim 9 wherein said mandrel is stationary and said female end of pipe is urged onto said mandrel to enlarge the interior and exterior diameters of said pipe at said female end.

13. The method of manufacturing a single piece of thermoplastic pipe as recited in claim 8 wherein said reinforcement band extends beyond a last thread of said internal thread, in a direction opposite said female leading edge.

14. The method of manufacturing a single piece of thermoplastic pipe as recited in claim 8 wherein said reinforcement band extends beyond a first thread of said internal thread, in a direction towards said female leading edge.

15. The method of claim 1, wherein enlarging the interior and exterior diameters of the female end further comprises heating said female end of the pipe such that the outer wall of said pipe deforms around at least a portion of the one or more edges of said reinforcement band thereby embedding said reinforcement band into the outer wall of said pipe at said female end.

16. A method for manufacturing a single piece of thermoplastic pipe comprising:

extruding said pipe into a predetermined interior diameter and exterior diameter, wherein said pipe has an outer wall comprising an interior surface and an exterior surface;

cutting said pipe into a desired length, said length of pipe having a male end with a male leading edge and a female end with a female leading edge;

securing a cylindrical reinforcement band circumferentially around at least a portion of the exterior surface of said female end, the cylindrical reinforcement band comprising one or more edges;

forming internal threads on the interior surface of said female end, wherein at least a portion of said internal threads are positioned opposite said reinforcement band; and forming external threads on the exterior surface of said male end.

17. The method of manufacturing a single piece of thermoplastic pipe as recited in claim 16 wherein said reinforcement band is press fit onto said exterior surface of said female end.

18. The method of manufacturing a single piece of thermoplastic pipe as recited in claim 16 wherein said step of securing a reinforcement band further comprises:

heating said reinforcement band to thermal-expand its internal diameter;

positioning said reinforcement band circumferentially around at least a portion of the exterior surface of said female end; and cooling said reinforcement band to thermally contract its internal diameter.

19. The method of manufacturing a single piece of thermoplastic pipe as recited in claim 18 wherein cooling said reinforcement band further comprises creating an interference fit between said reinforcement band and said at least a portion of the exterior surface of said female end.

20. The method of manufacturing a single piece of thermoplastic pipe as recited in claim 16, further comprising:

embedding at least a portion of the one or more edges of said reinforcement band into the outer wall of said pipe at said female end.

21. The method of manufacturing a single piece of thermoplastic pipe as recited in claim 16 wherein said reinforcement band extends beyond the last thread of said internal thread, in a direction opposite said female leading edge.

* * * * *